United States Patent
Liu et al.

(10) Patent No.: US 10,630,896 B1
(45) Date of Patent: Apr. 21, 2020

(54) COGNITIVE DYNAMIC PHOTOGRAPHY GUIDANCE AND POSE RECOMMENDATION

(71) Applicant: International Business Machines Corporation, Armonk, NY (US)

(72) Inventors: Su Liu, Austin, TX (US); Qin Qiong Zhang, Beijing (CN); Kai Liu, Beijing (CN); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/276,086

(22) Filed: Feb. 14, 2019

(51) Int. Cl.
- *H04N 5/232* (2006.01)
- *G06T 7/00* (2017.01)
- *G06T 7/73* (2017.01)

(52) U.S. Cl.
CPC ........... *H04N 5/23222* (2013.01); *G06T 7/74* (2017.01); *G06T 2207/30244* (2013.01)

(58) Field of Classification Search
CPC .................. H04N 5/23222; G06T 7/74; G06T 2207/30244
See application file for complete search history.

(56) References Cited

U.S. PATENT DOCUMENTS

| | | | |
|---|---|---|---|
| 7,805,066 B2 * | 9/2010 | Wexler | H04N 5/23222 396/429 |
| 8,781,175 B2 | 7/2014 | Wang et al. | |
| 9,325,862 B2 * | 4/2016 | Nakamura | H04L 67/42 |
| 9,509,867 B2 * | 11/2016 | Camp, Jr. | H04M 1/72572 |
| 9,716,826 B2 | 7/2017 | Wu et al. | |
| 9,727,802 B2 | 8/2017 | Wang et al. | |
| 2005/0172147 A1 * | 8/2005 | Edwards | H04M 1/72572 726/22 |
| 2007/0288197 A1 * | 12/2007 | Martin | G01C 15/008 702/152 |

(Continued)

FOREIGN PATENT DOCUMENTS

| | | |
|---|---|---|
| CN | 104717413 A | 6/2015 |
| JP | 2017076315 A | 4/2017 |
| KR | 100943548 B1 | 2/2010 |

OTHER PUBLICATIONS

Ma et al., "Pose Maker: A Pose Recommendation System for Person in the Landscape Photographing," ACM Multimedia, 2014, pp. 1053-1056.

(Continued)

*Primary Examiner* — Shahbaz Nazrul
(74) *Attorney, Agent, or Firm* — Zilka-Kotab, P.C.

(57) ABSTRACT

A computer-implemented method includes determining a location of a device in relation to a geographical feature. The method includes determining a cognitively generated subject location for a subject of a photograph relative to the geographical feature. The cognitively generated subject location is determined based at least in part on sample photographs of the geographical feature. The method includes outputting guidance for instructing the subject to move to the cognitively generated subject location and determining a recommended pose for the subject based at least in part on a cognitively generated user profile. The method also includes outputting guidance for instructing the subject to strike the recommended pose.

20 Claims, 4 Drawing Sheets

(56) References Cited

U.S. PATENT DOCUMENTS

| | | | |
|---|---|---|---|
| 2009/0049408 A1* | 2/2009 | Naaman | G06F 3/0482 |
| | | | 715/835 |
| 2009/0115855 A1* | 5/2009 | Gotoh | H04N 1/00132 |
| | | | 348/207.11 |
| 2010/0053371 A1* | 3/2010 | Karimoto | H04N 1/00204 |
| | | | 348/231.3 |
| 2010/0245610 A1 | 9/2010 | Ahn et al. | |
| 2010/0250136 A1* | 9/2010 | Chen | G06T 1/0021 |
| | | | 701/300 |
| 2011/0050909 A1* | 3/2011 | Ellenby | G03B 17/24 |
| | | | 348/207.1 |
| 2011/0184953 A1 | 7/2011 | Joshi et al. | |
| 2013/0188061 A1 | 7/2013 | Ellenby et al. | |
| 2014/0354768 A1 | 12/2014 | Mei et al. | |
| 2015/0154230 A1 | 6/2015 | Wus et al. | |
| 2015/0365545 A1 | 12/2015 | Wu | |

OTHER PUBLICATIONS

Wang et al., "Human Posture Recognition Based on Images Captured by the Kinect Sensor," International Journal of Advanced Robotic Systems, 2016, pp. 1-16.

Park et al., "Human Posture Recognition Using Curve Segments for Image Retrieval," SPIE Digital Library, 1999, 10 pages, retrieved from https://pdfs.semanticscholar.org/6496/a1a9d96dcca186ff6bef41c65d9a5d5079f3.pdf.

IBM, "Personality Insights," IBM Watson, 2019, 8 pages, retrieved from https://www.ibm.com/watson/services/personality-insights/.

* cited by examiner

COGNITIVE DYNAMIC PHOTOGRAPHY GUIDANCE AND POSE RECOMMENDATION

BACKGROUND

The present invention relates to photography, and more specifically, this invention relates to cognitive dynamic photography guidance and pose recommendation.

The quality of photographs taken by the average photographer is often associated with the photographer's knowledge, ability, and the time available to take a photograph. Taking the perfect photograph may be difficult and/or time consuming if the photographer is not skilled and/or there is limited time to take a photograph. Conventional photography methods provide little guidance for positioning photographer(s) and/or the subject(s) of the photograph in order to obtain a desired photograph.

SUMMARY

A computer-implemented method according to one embodiment includes determining a location of a device in relation to a geographical feature. The method includes determining a cognitively generated subject location for a subject of a photograph relative to the geographical feature. The cognitively generated subject location is determined based at least in part on sample photographs of the geographical feature. The method includes outputting guidance for instructing the subject to move to the cognitively generated subject location and determining a recommended pose for the subject based at least in part on a cognitively generated user profile. The method also includes outputting guidance for instructing the subject to strike the recommended pose.

A computer program product according to one embodiment includes a computer readable storage medium having program instructions embodied therewith. The computer program product includes program instructions executable by a computer. The program instructions cause the computer to perform the foregoing method.

A system according to one embodiment includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for cognitive dynamic photography guidance and pose recommendation.

In one general embodiment, a computer-implemented method includes determining a location of a device in relation to a geographical feature. The method includes determining a cognitively generated subject location for a subject of a photograph relative to the geographical feature. The cognitively generated subject location is determined based at least in part on sample photographs of the geographical feature. The method includes outputting guidance for instructing the subject to move to the cognitively generated subject location and determining a recommended pose for the subject based at least in part on a cognitively generated user profile. The method also includes outputting guidance for instructing the subject to strike the recommended pose.

In another general embodiment, a computer program product includes a computer readable storage medium having program instructions embodied therewith. The computer program product includes program instructions executable by a computer. The program instructions cause the computer to perform the foregoing method.

In another general embodiment, a system includes a processor and logic integrated with the processor, executable by the processor, or integrated with and executable by the processor. The logic is configured to perform the foregoing method.

Figure 1:
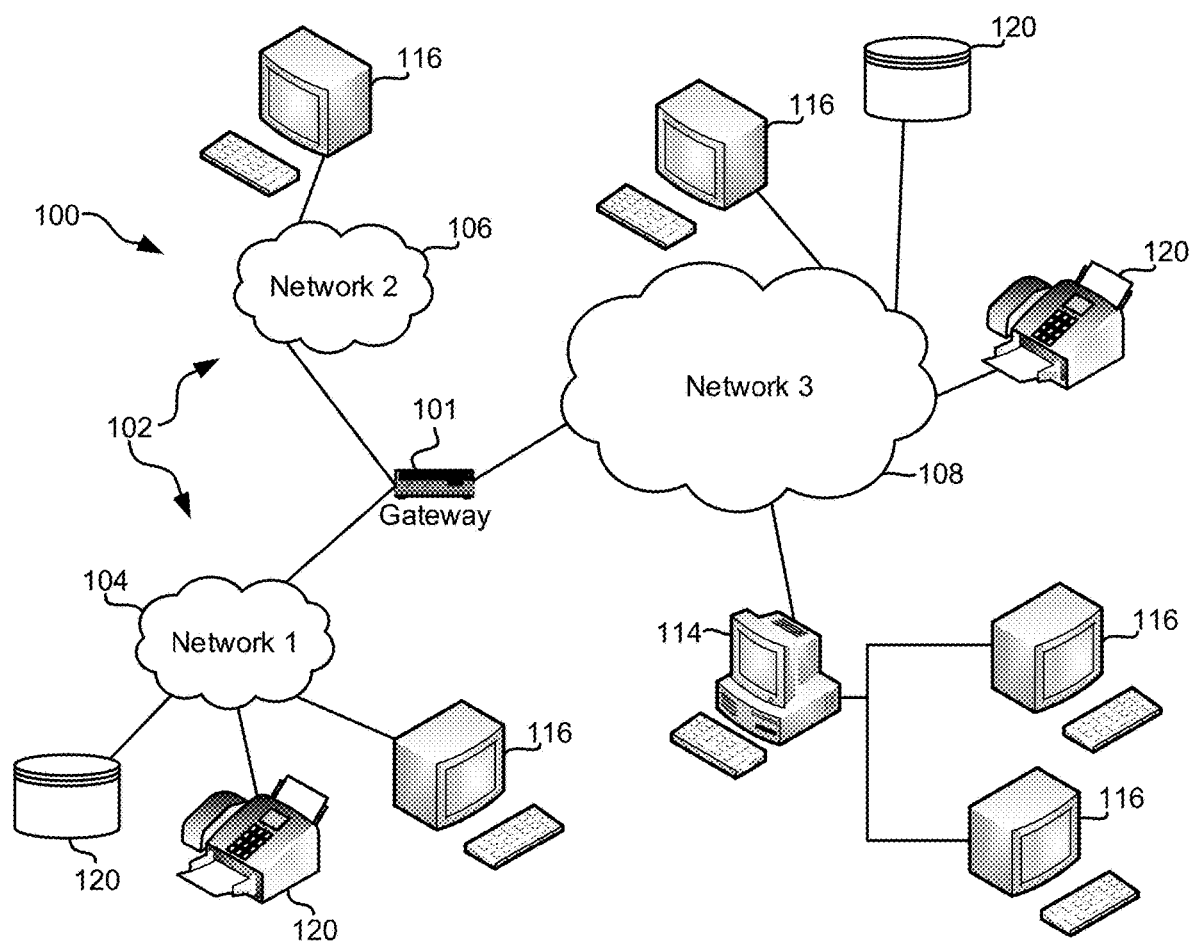
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
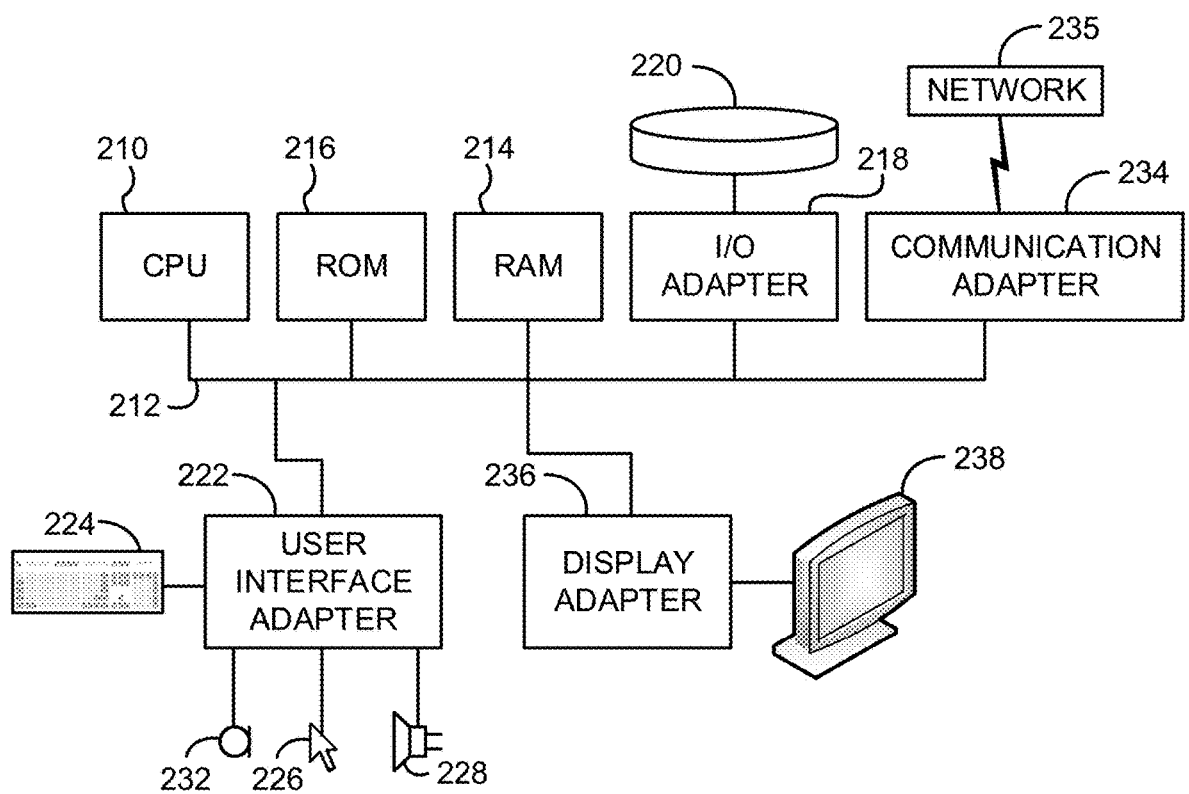
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

The quality of a photograph is often correlated with the photographer's knowledge, skill, and the time available to take the perfect photograph. Additionally, the quality of the photograph may be correlated to how well the subject of the photograph is able to strike a pose. The quality of a photograph may be improved by providing guidance to the photographer and/or the subject of the photograph, especially in cases where the photographer and/or subject of the photograph wishes to emulate poses and/or photographs derived from a database of photographs.

There are a variety of social media and/or photosharing applications through which users upload photographs to the internet. Photographs are typically uploaded during and/or following periods of travel. Users may wish to emulate photographs that they find on social media when they travel to the same or similar destinations. Taking the perfect photograph may be difficult and/or time consuming if the photographer is not skilled and/or there is limited time to spend at a destination.

For example, a user plans to travel to Pamukkale. The user may look at various social media posts about Pamukkale and hope to take similar photographs. It may be difficult for the user to emulate the photograph with limited skills and limited time to spend at the particular location. It may be difficult to find the right vantage point to take the photograph and/or the user might not have enough time to find the right pose if they are on a guided tour, they have a busy itinerary, there is a line of people waiting to take a photograph in the same location, etc.

Various embodiments disclosed herein describe a method of cognitive dynamic photography guidance and/or pose recommendation in order to guide the photographer and/or the subject of the photograph in real-time into desirable angles and/or poses which emulate those found on social media. Some of the various approaches herein help users to efficiently take high quality photographs based on the location.

A "subject" may be used herein generally to describe an object of the photograph. In some instances, the user and the subject may be used interchangeably. For example, the user associated with a user device may be the subject of the photograph if the user asks another person to take a photograph of the user with the user's device.

Figure 3:
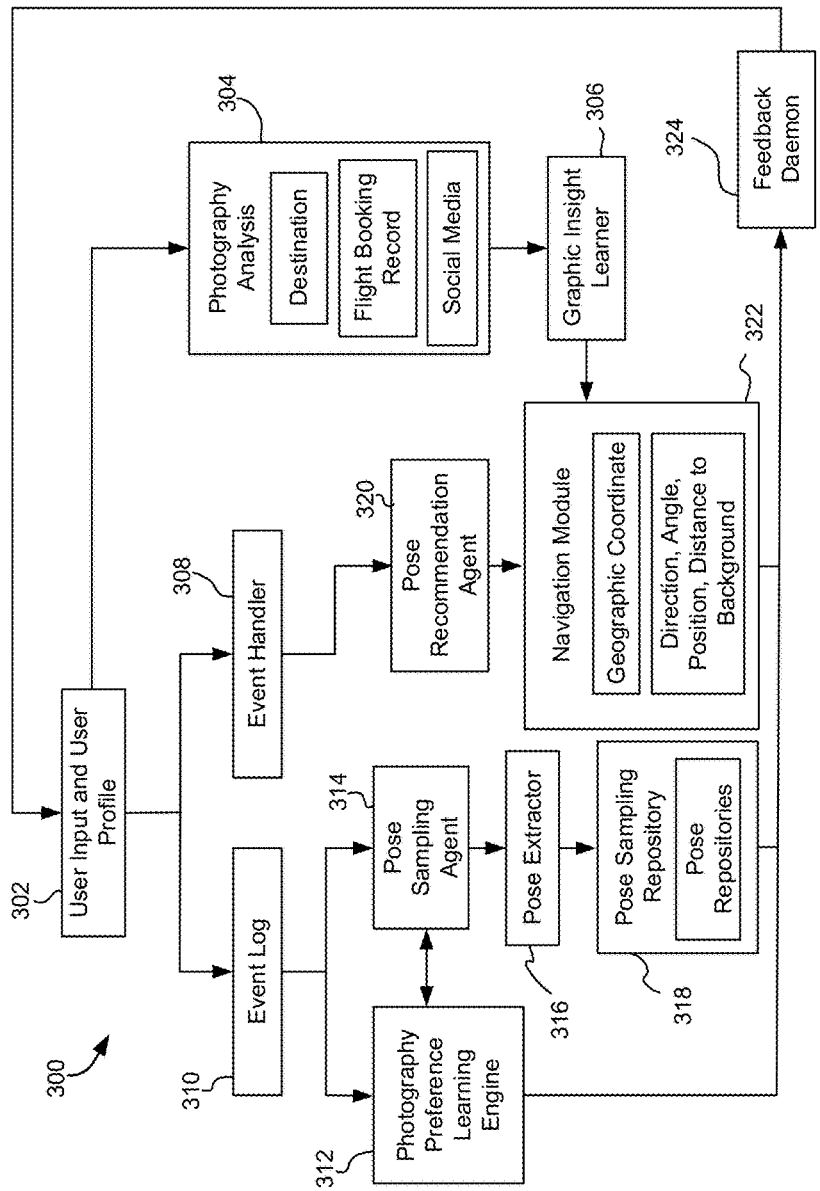
FIG. 3 is a high-level architecture of modules for performing various operations of FIG. 4, in accordance with various embodiments.
Figure 4:
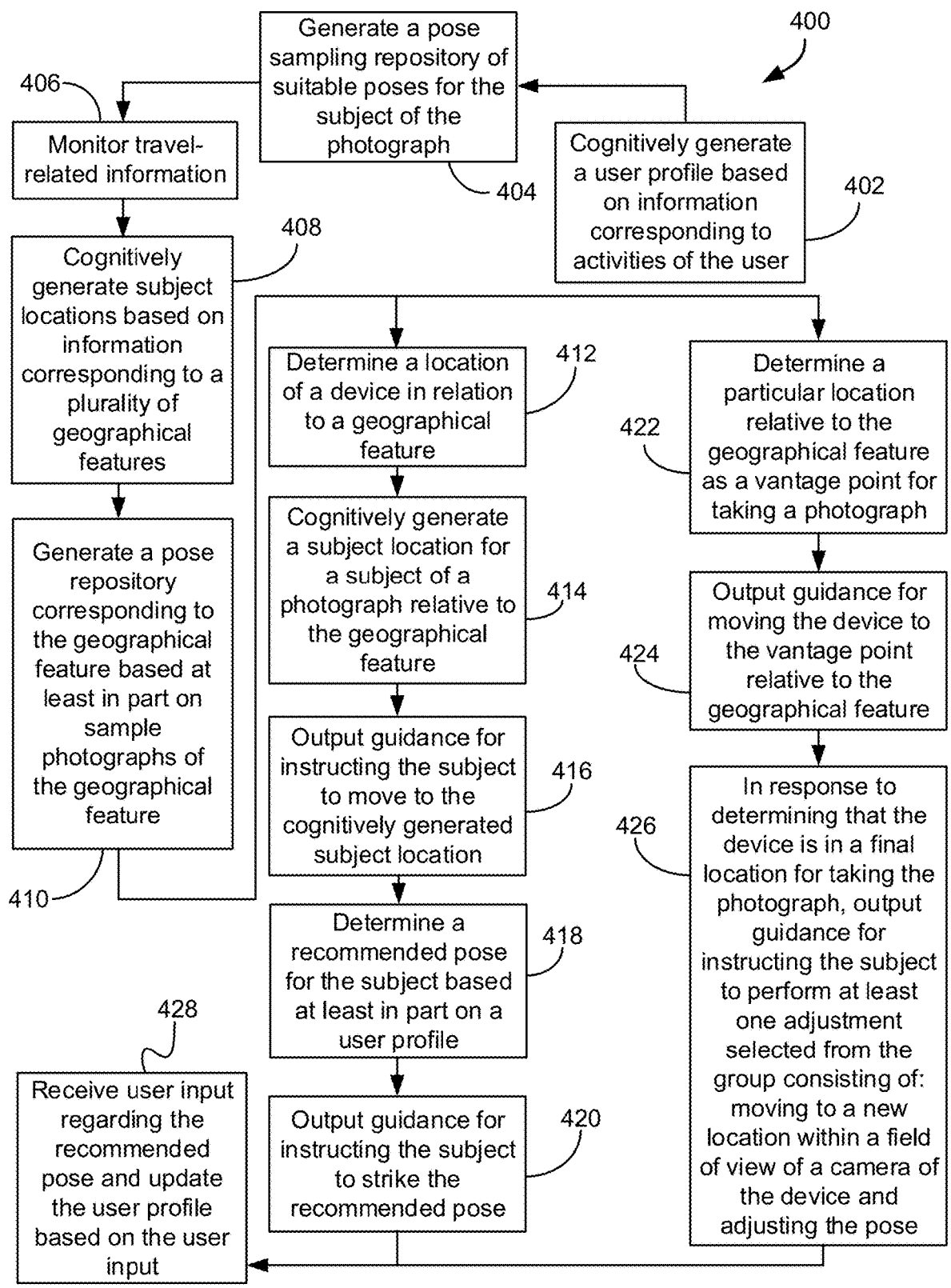
FIG. 4 is a flowchart of a computer-implemented method, in accordance with one embodiment.

FIG. 3 illustrates a high-level architecture 300 of modules for performing various embodiments of FIGS. 1-2 and 4, among others, in various approaches. Note that some of the elements shown in FIG. 3 may be implemented as hardware and/or software, according to various embodiments. Of course, more or less modules than those specifically depicted in FIG. 3 may be included in architecture 300, as would be understood by one of ordinary skill in the art upon reading the present descriptions.

In a preferred approach, the following modules of the architecture function with the user's permission. The user may enable or disable one or more of the modules of the architecture at any time. The user may limit sources from which one or more of the modules gather information.

The architecture 300 may comprise a user input and user profile module 302. User input may comprise activities of the user which are gathered with the user's permission. Activities of a user may comprise social communications, social media posts, social media preferences (e.g., "favorites," "hearts," "likes," "pins," "upvotes," "retweets," "faves," etc.), other preferences, photographs stored in a photo library, shared photographs, or any other user input type known in the art. In one approach, the user input may be collected from other sources such as detected facial expressions, audio input, textual input, etc. For example, a user device may use any facial recognition technology known in the art to recognize a positive response from the user when viewing sample images, etc. In another example, a user input and user profile module 302 may be capable of collecting user verbally spoken preferences for photographs including "I like this photograph." In a preferred approach, user input includes manually entered preferences. User input may be stored in an associated user profile. User input may be stored in a user profile in any manner known in the art. In a preferred embodiment, the user input is stored in a table in the user profile.

The architecture 300 may comprise a photography analysis module 304. A photography analysis module 304 may be configured to track and/or monitor activities of a user with the user's permission. In a preferred approach, the photography analysis module tracks and/or monitors a user's travel plan and related information. Related information may include destinations, transportation itineraries, information derived from email applications, calendar applications, social media applications, travel applications, transportation applications, etc.

The architecture 300 may comprise a graphic insight learner 306. A graphic insight learner 306 may be a module for predicting subject locations for photographs. Predicting subject locations may comprise analyzing sample photographs, user activity, social media preferences, etc. Subject locations may be locations for the subject of a photograph to be positioned relative to a geographical feature for a photograph. In some embodiments, the graphic insight learner 306 may be a module for predicting vantage points for capturing a photograph relative to a geographical feature. A geographical feature may be a landmark, a monument, a geographical location, a building, etc. In some approaches, the graphic insight learner 306 may pre-load any geographic information associated with the subject location(s) prior to the derived date of travel. A derived date of travel may refer to the specific date that a user travels to a location, a series of dates that a user travels to a location, a time associated with a user's travel, etc. A derived date of travel may be determined according to various operations of the photography analysis module 304.

In various embodiments, subject locations may be cognitively generated. Subject locations may be cognitively generated by a user device, by a server, by any combination of user device and server, etc. (e.g., such as user device 116 and/or server 114 of FIG. 1). Such a user device and/or server may include any combination of modules as described in FIG. 3 for cognitively generating subject locations.

In other approaches, the graphic insight learner 306 predicts geographical features related to travel plans as determined by the photography analysis module 304. For example, the photography analysis module 304 may determine that the user is traveling to France. The graphic insight learner 306 may predict that the user may visit the Arc de Triomphe, the Eiffel Tower, the Louvre, etc., while in France and predict subject locations relative to the aforementioned geographical features.

The architecture 300 may comprise an event handler module 308. An event handler module 308 may be configured for logging and/or managing user-application operations and/or interactions with the user's permission. Operations and/or interactions may comprise a user's events, activities, conversations, etc. which may originate from multiple sources. Operations and/or interactions may include information derived from email applications, calendar applications, social media applications, travel applications, transportation applications, etc.

The architecture 300 may comprise an event log 310. An event log 310 may be a module for storing information gathered from other modules with the user's permission. The event log 310 may comprise information such as active web links, viewed web content and/or links to viewed web content, etc. The information stored in the event log 310 may be stored in any form known in the art. In a preferred approach, the information in the event log 310 may be stored in a table.

The architecture 300 may comprise a photography preference learning engine 312. A photography preference learning engine 312 cognitively generates a user profile based on user input as described above. A photography preference learning engine 312 may cognitively generate various user preferences to be stored in the user profile based on the user input. For example, the photography preference learning engine 312 may infer a user prefers standing poses to sitting poses where a majority of the user's preferred photographs contain standing poses.

The architecture 300 may comprise a pose sampling agent 314. A pose sampling agent 314 may be a module for understanding a user's personal preferences. A user's personal preferences may be manually input by the user. A user's personal preferences may be cognitively determined based on social media preferences, browsed web content, frequently visited web content, a user's own social media posts, etc. which have been gathered with the user's permission. In some approaches, the user preferences may be generated by the photography preference learning engine 312 based on user input.

The architecture 300 may comprise a pose extractor 316. A pose extractor 316 may be a module for extracting suitable poses for a user based on the user's personal preferences. The pose extractor 316 may extract suitable poses from a user's stored photographs, shared photographs, frequently browsed photographs, social media preferences as listed above based on various social media applications, etc. The pose extractor 316 may extract poses from the photographs in any manner known in the art. In some approaches, any technique known in the art may be used to extract facial expressions.

The architecture 300 may comprise a pose sampling repository 318. A pose sampling repository 318 may comprise a list of suitable poses. The pose sampling repository 318 may comprise poses extracted by the pose extractor 316. In some approaches, the pose sampling repository 318 may comprise facial expressions extracted by the pose extractor 316. The pose sampling repository 318 may comprise poses which are generally applicable for any user. Poses which are generally applicable for any user may be downloaded directly, available via a cloud-based service on-demand, etc.

The pose sampling repository 318 may comprise one or more pose repositories which correspond to one or more geographical features. Poses in pose repositories may be generated based at least in part on sample photographs of the geographical features.

The architecture 300 may comprise a pose recommendation agent 320. A pose recommendation agent 320 may be a module for determining a recommended pose and/or providing guidance for the photographer and/or the subject of the photograph. A pose recommendation agent 320 may provide the user with an option of one or more recommended poses based at least in part on the suitable poses in the pose repository corresponding to the geographical feature. In some approaches, the user may choose to decline the recommended pose(s) in favor of a pose from either the pose sampling repository or a pose repository corresponding to a geographical feature.

The pose recommendation agent 320 may provide guidance for the subject to adjust the chosen pose. The pose recommendation agent 320 may provide guidance using any positioning system and/or data known in the art. In a preferred approach, the pose recommendation agent 320 may use global positioning system (GPS) capabilities, directions, coordinates, etc. to provide guidance.

The architecture 300 may comprise a navigation module 322. The navigation module 322 may be configured to provide navigational guidance to the device and/or the subject to move to the vantage point and/or the subject location. In one approach, the navigation module 322 uses GPS technology to provide navigational guidance. The navigation module 322 may be configured to determine a location of a device in relation to a geographical feature as discussed in further detail in reference to FIG. 4. It should be noted that GPS navigation is used by way of example only and one having ordinary skill in the art would understand that the inventive concepts disclosed herein may be implemented using any positioning system and/or data.

The architecture 300 may comprise a feedback daemon 324. A feedback daemon 324 may be a module configured to receive user input regarding the recommended pose. The feedback daemon 324 may be configured to update the user profile based on the user input. Updating the user profile may comprise updating the pose sampling repository 318 and/or the pose repository associated with the geographical feature. The user input may be manually input. In one approach, the user profile is cognitively updated when the feedback daemon 324 receives user input. For example, the user profile may be updated to increase the preference for a pose if the user used the recommended pose in a photograph and/or posted the photograph on social media. In other examples, the user may be provided an option to rate the recommended poses, the guidance, etc.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

In a preferred approach, the following operations are performed with the user's permission. The user may enable or disable one or more of the operations of the method at any time. The user may limit sources from which one or more of the operations gather information.

As shown in FIG. 4, method 400 includes operation 402 which comprises generating a user profile based on information corresponding to activities of the user gathered with the user's permission. Activities of the user may include social communications, social media posts, social media preferences (e.g., "favorites," "hearts," "likes," "pins," "upvotes," "retweets," "faves," etc.), browsed web content, frequently visited web content, a user's own social media posts, photographs stored in a photo library, shared photographs, information derived from email applications, calendar applications, social media applications, travel applications, transportation applications, active web links, viewed web content, etc. Information corresponding to the user may be stored in any form known in the art. In an exemplary embodiment, the information corresponding to the user may be stored in the user profile as a table.

In various approaches, operation 402 may comprise cognitively generating the user profile using a user device, a server, any combination of user devices and servers, etc. (e.g., such as user device 116 and/or server 114 of FIG. 1). Such a user device and/or server may include any combination of modules as described in FIG. 3 for cognitively generating the user profile.

In one approach, the user profile is stored on a user device. The user device may be a mobile phone, a camera, a tablet, etc. In some approaches, the user device is associated with the user profile because the user device is capable of capturing photographs in accordance with at least some of the embodiments of method 400. In other approaches, the user profile is stored in a cloud-based service and may be provided to any user device when method 400 is initiated. In even further approaches, the user profile may be stored on a user device and in a cloud-based service.

Operation 404 may comprise generating a pose sampling repository of suitable poses for the subject of the photograph. A pose sampling repository may comprise any cognitively determined suitable poses. The pose sampling repository may comprise suitable poses corresponding to a particular geographic feature, suitable poses for general use, suitable poses which may be used for a particular geographical feature and/or general use, etc. The pose sampling repository of suitable poses for the subject of the photograph may be created based on the subject's preferences and/or activities. The subject's preferences and/or activities may be derived from the subject's user profile. In one approach, the user profile includes a pose sampling repository of suitable poses for the subject of the photograph. In various embodiments, a recommended pose is selected based at least in part on the suitable poses in the pose sampling repository. Poses may be extracted from user input using any known technique in the art.

In some approaches, the pose sampling repository may comprise extracted facial expressions. Suitable facial expressions may be cognitively determined as described regarding determining suitable poses. Facial extractions may be extracted via any technique known in the art.

Operation 406 may comprise monitoring travel-related information. Travel-related information may be monitored with the user's permission. Travel-related information may include destinations, transportation itineraries, information derived from email applications, calendar applications, social media applications, travel applications, transportation applications, etc. Travel-related information may correspond to the user associated with the user device and/or the subject of the photograph. It should be noted that the user associated with the user device may also be the subject of the photograph.

For example, a first friend's phone may be associated with the first friend's user profile. However, the second friend may be the subject of a photograph taken with the first friend's phone. The first friend's phone may be capable of associating with the second friend's user profile via a cloud-based service, pre-processing, etc.

Operation 408 may comprise generating subject locations based on information corresponding to a plurality of geographical features. A geographical feature may be a landmark, a monument, a geographical location, a building, etc. Subject locations may comprise locations relative to a geographical feature where a subject should move to in order to capture a desired photograph. Subject locations may be cognitively generated by analyzing sample photographs, user activity, social media, etc. In preferred approaches, the subject location is determined based at least in part on sample photographs of the geographical features. In one approach, subject locations may be cognitively generated by a user device, by a server, by any combination of user device and server, etc. (e.g., such as user device 116 and/or server 114 of FIG. 1). Such a user device and/or server may include any combination of modules as described in FIG. 3 for cognitively generating subject locations.

In one embodiment, operation 408 may include generating a localized, optimal time-of-day recommendation associated with one or more subject locations. A localized, optimal time-of-day recommendation may be based on seasonal variations associated with the subject location (e.g., opening and/or closing hours, seasonal decorations, etc.), sunlight and/or moonlight conditions, sunrise and/or sunset times, weather forecasts, etc. A localized, optimal time-of-day recommendation may be derived from information gathered by a user device and/or various applications located thereon.

Operation 410 may comprise generating a pose repository corresponding to the geographical feature based at least in part on sample photographs of the geographical feature. In some approaches, the pose repository may be a subset of the pose sampling repository generated in operation 404. In a preferred approach, there are multiple pose repositories within the pose sampling repository. Each pose repository may be associated with individual geographical features and/or a series of geographical features. In various embodiments, a recommended pose may be selected from the pose repository corresponding to the geographical feature.

Operation 412 may comprise determining a location of a device in relation to a geographical feature. Determining the location of the device in relation to a geographical feature may comprise using any positioning system and/or data known in the art. In a preferred approach, method 400 uses a GPS system to determine a location of a device in relation to a geographical feature.

Operation 414 may comprise determining a cognitively generated subject location for a subject of a photograph relative to the geographical feature. In one approach, the cognitively generated subject locations are determined based at least in part on sample photographs of the geographical feature. Cognitively generated subject locations may comprise locations relative to a geographical feature where a subject should move to in order to capture a desired photograph. A cognitively generated subject location may be denoted by a geographic coordinate, a direction, an angle, a position, a relative distance to the geographical feature, etc.

Operation 416 may comprise outputting guidance for instructing the subject to move to the cognitively generated subject location. Guidance may be output visually on a display of the user device, audibly through the user device, via haptic guidance, etc. The guidance may be output via any combination of the foregoing techniques. Guidance for instructing the subject to move to the cognitively generated subject location may be output in any form known in the art.

Operation 418 may comprise determining a recommended pose for the subject based at least in part on a user profile, which in some approaches is cognitively generated. The user profile may be associated with the subject of the photograph, the photographer, a combination of the subject of the photograph and the photographer, a user profile generated based on popular user preferences, etc. In a preferred approach, operation 418 comprises determining a recommended pose for the subject of the photograph based at least in part on the user profile which is associated with the subject of the photograph.

In some approaches, determining a recommended pose at least in part on a user profile may include using a service to derive insights about a user's preferences. An exemplary service includes IBM Watson Personality Insights (International Business Machines Corporation (IBM), 1 New Orchard Road, Armonk, N.Y. 10504-1722, United States). Any application programming interface (API) known in the art may be used in method 400 to communicate with services.

Operation 420 may comprise outputting guidance for instructing the subject to strike the recommended pose. Guidance may be output via any of the techniques referenced in operation 416. Guidance for instructing the subject to strike the recommended pose may comprise outputting guidance for instructing the subject to perform at least one adjustment. An adjustment may be moving to new location in a field of view of a camera of the device, adjusting the pose, adjusting a facial expression, etc.

Operation 422 may comprise determining a particular location relative to the geographical feature as a vantage point for taking a photograph. A vantage point may be a location where the subject and the geographical feature are in the field of view of the camera. Determining the vantage point may be based at least in part on sample photographs of the geographical feature. In a preferred approach, method 400 uses a GPS system to determine a particular location relative to a geographical feature as a vantage point for taking a photograph. Again, GPS is used by way of example only and one having ordinary skill in the art would understand that method 400 may use any positioning system and/or data to perform any of the operations as described herein.

Operation 424 may comprise outputting guidance for moving the device to the vantage point relative to the geographical feature. Guidance may be output via any of the techniques referenced in operation 416. Outputting guidance for moving the device may include moving the device to a new location, adjusting the height of the device, adjusting the angle of the device, etc. A vantage point relative to a geographic feature may be denoted by a geographic coordinate, a direction, an angle, a position, a relative distance to the geographical feature, etc. In one approach, vantage points may be cognitively generated by a user device, by a server, by any combination of user device and server, etc. (e.g., such as user device 116 and/or server 114 of FIG. 1). Such a user device and/or server may include any combination of modules as described in FIG. 3 for cognitively generating vantage points relative to the geographic feature.

In some approaches, operation 424 may provide additional guidance regarding the operation of the user device including turning flash on/off, adjusting a filter, turning high dynamic range imaging (HDR) on/off, etc.

Operation 426 may comprise, in response to determining that the device is in a final location for taking the photograph, outputting guidance for instructing the subject to perform at least one adjustment. Guidance may be output via any of the techniques referenced in operation 416. An adjustment may be moving the subject to new location in a field of view of a camera of the device, adjusting the pose, adjusting a facial expression, etc.

Operation 428 may comprise receiving user input regarding the recommended pose and updating the user profile based on the user input. Updating the user profile may comprise updating the pose sampling repository. In one approach, user input may be manually input. In another approach, the user profile is cognitively updated when the feedback daemon receives user input. For example, the user profile may be updated to increase the preference for a pose if the user uses the recommended pose in a photograph and/or posts the photograph on social media.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   determining a location of a device in relation to a geographical feature;
   determining a cognitively generated subject location for a subject of a photograph relative to the geographical feature, the cognitively generated subject location being determined based at least in part on sample photographs of the geographical feature;
   outputting guidance for instructing the subject to move to the cognitively generated subject location;
   determining a recommended pose for the subject based at least in part on a cognitively generated user profile; and
   outputting guidance for instructing the subject to strike the recommended pose.

2. The computer-implemented method of claim 1, comprising:
   determining a particular location relative to the geographical feature as a vantage point for taking a photograph, the vantage point being determined based on sample photographs of the geographical feature; and
   outputting guidance for moving the device to the vantage point relative to the geographical feature.

3. The computer-implemented method of claim 1, in response to determining that the device is in a final location for taking the photograph, outputting guidance for instructing the subject to perform at least one adjustment selected from the group consisting of: moving to a new location within a field of view of a camera of the device, and adjusting the pose.

4. The computer-implemented method of claim 1, comprising generating the user profile based on information corresponding to activities of the user.

5. The computer-implemented method of claim 1, comprising monitoring travel-related information; and generating subject locations corresponding to a plurality of geographical features.

6. The computer-implemented method of claim 1, comprising generating a pose repository corresponding to the geographical feature based at least in part on sample photographs of the geographical feature, wherein the recommended pose is selected from the pose repository corresponding to the geographical feature.

7. The computer-implemented method of claim 1, wherein the user profile includes a pose sampling repository of suitable poses for the subject of the photograph, wherein the recommended pose is selected based at least in part on suitable poses in the pose sampling repository.

8. The computer-implemented method of claim 1, comprising receiving user input regarding the recommended pose; and updating the user profile based on the user input.

9. A computer program product for photography guidance, the computer program product comprising a computer readable storage medium having program instructions embodied therewith, the program instructions executable by a computer to cause the computer to:
   determine, by the computer, a location of a device in relation to a geographical feature;
   determine, by the computer, a cognitively generated subject location for a subject of a photograph relative to the geographical feature, the cognitively generated subject location being determined based at least in part on sample photographs of the geographical feature;
   output, by the computer, guidance for instructing the subject to move to the cognitively generated subject location;
   determine, by the computer, a recommended pose for the subject based at least in part on a cognitively generated user profile; and
   output, by the computer, guidance for instructing the subject to strike the recommended pose.

10. The computer program product of claim 9, comprising program instructions executable by a computer to cause the computer to:
   determine, by the computer, a particular location relative to the geographical feature as a vantage point for taking a photograph, the vantage point being determined based on sample photographs of the geographical feature; and
   output, by the computer, guidance for moving the device to the vantage point relative to the geographical feature.

11. The computer program product of claim 9, comprising program instructions executable by a computer to cause the computer to: in response to determining that the device is in a final location for taking the photograph, output, by the computer, guidance for instructing the subject to perform at least one adjustment selected from the group consisting of: moving to a new location within a field of view of a camera of the device, and adjusting the pose.

12. The computer program product of claim 9, comprising program instructions executable by a computer to cause the computer to: generate, by the computer, the user profile based on information corresponding to activities of the user.

13. The computer program product of claim 9, comprising program instructions executable by a computer to cause the computer to: monitor, by the computer, travel-related information; and generate, by the computer, subject locations corresponding to a plurality of geographical features.

14. The computer program product of claim 9, comprising program instructions executable by a computer to cause the computer to: generate, by the computer, a pose repository corresponding to the geographical feature based at least in part on sample photographs of the geographical feature, wherein the recommended pose is selected from the pose repository corresponding to the geographical feature.

15. The computer program product of claim 9, wherein the user profile includes a pose sampling repository of suitable poses for the subject of the photograph, wherein the recommended pose is selected based at least in part on suitable poses in the pose sampling repository.

16. The computer program product of claim 9, comprising program instructions executable by a computer to cause the computer to: receive, by the computer, user input regarding the recommended pose; and update, by the computer, the user profile based on the user input.

17. A system, comprising:
a processor; and
logic integrated with the processor, executable by the processor, or integrated with and executable by the processor, the logic being configured to:
determine a location of a device in relation to a geographical feature;
determine a cognitively generated subject location for a subject of a photograph relative to the geographical feature, the cognitively generated subject location being determined based at least in part on sample photographs of the geographical feature;
output guidance for instructing the subject to move to the cognitively generated subject location;
determine a recommended pose for the subject based at least in part on a cognitively generated user profile; and
output guidance for instructing the subject to strike the recommended pose.

18. The system of claim 17, comprising:
determining a particular location relative to the geographical feature as a vantage point for taking a photograph, the vantage point being determined based on sample photographs of the geographical feature; and
outputting guidance for moving the device to the vantage point relative to the geographical feature.

19. The system of claim 17, in response to determining that the device is in a final location for taking the photograph, outputting guidance for instructing the subject to perform at least one adjustment selected from the group consisting of: moving to a new location within a field of view of a camera of the device, and adjusting the pose.

20. The system of claim 17, comprising generating the user profile based on information corresponding to activities of the user.

* * * * *